Feb. 13, 1962 H. A. COOK 3,020,901
SUPERCHARGER FOR INTERNAL COMBUSTION ENGINES
Filed Jan. 24, 1961 2 Sheets-Sheet 1

INVENTOR.
HARVEY A. COOK
BY
ATTORNEYS

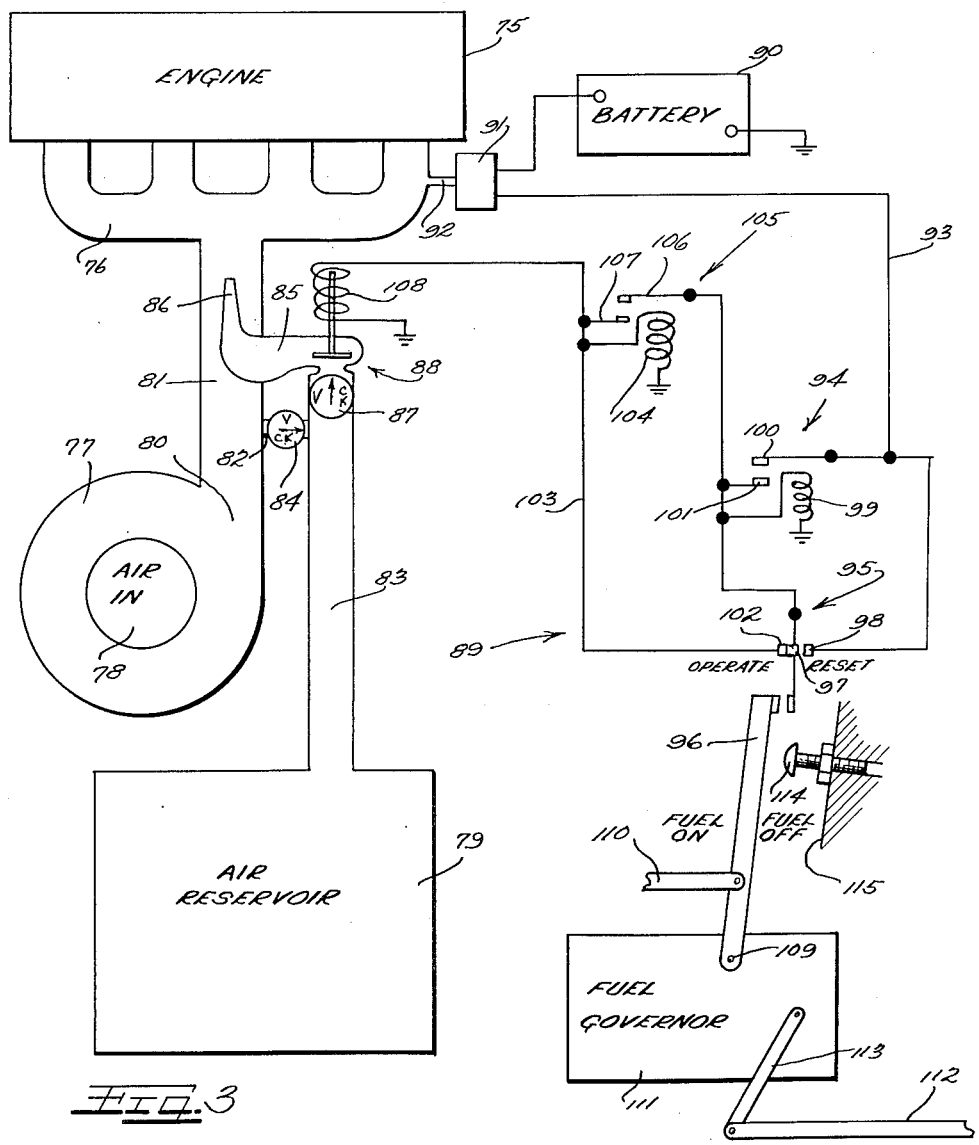

United States Patent Office 3,020,901
Patented Feb. 13, 1962

3,020,901
SUPERCHARGER FOR INTERNAL
COMBUSTION ENGINES
Harvey A. Cook, Cleveland, Ohio, assignor to Thompson Ramo Wooldridge Inc., Cleveland, Ohio, a corporation of Ohio
Filed Jan. 24, 1961, Ser. No. 84,550
9 Claims. (Cl. 123—119)

This invention relates to internal combustion engines and, more particularly, to means for improving the air supply system for an internal combustion engine.

Superchargers are commonly used on diesel and gasoline internal combustion engines to improve their operating characteristics. The superchargers commonly used have rotary or centrifugal blowers which pump the charge into the engine cylinders at an increase in pressure above atmospheric. Such supercharger systems are capable of providing an increase in the power output and the volumetric efficiency of an engine, as well as an increase in the thermal efficiency of the engine due to better mixing of the fuel and air and a better distribution of the fuel mixture to the various cylinders.

One type of supercharger in use is called a turbocharger which has a rotary turbine and a blower which are driven by the exhaust gases from the internal combustion engine.

While superchargers of these types have vastly increased the power output of internal combustion engines they have been found to be deficient when the fuel flow to the engine is being increased. Conventional superchargers have not been able to provide the additional amount of air needed during these periods.

Accordingly, it is an object of this invention to provide an improved supercharger for an internal combustion engine which has means to augment the air flow to the internal combustion engine when the fuel flow to the engine is being increased. In this way the engine is able to take on an increased load without hesitation and all of the fuel is burned cleanly and efficiently.

It is another object of this invention to provide an internal combustion engine that has better response to throttle and engine governor action.

It is another object of this invention to provide a supercharger that has an air reservoir and means for charging the reservoir during periods of relatively steady state operation of the engine and for discharging the stored air during periods of acceleration.

It is another object of this invention to provide a supercharger which is connected by hydraulic means to be responsive to the fuel control apparatus of the internal combustion engine.

It is still another object of this invention to provide a supercharger which is electrically connected to be responsive to the fuel control apparatus of the engine.

Other objects, features and advantages of the present invention will be apparent from the following detailed description taken in conjunction with the accompanying figures of the drawings, in which:

FIGURE 3 is an illustration of an electrically controlled supercharger system constructed in accordance with another embodiment of the invention.

Figure 1:
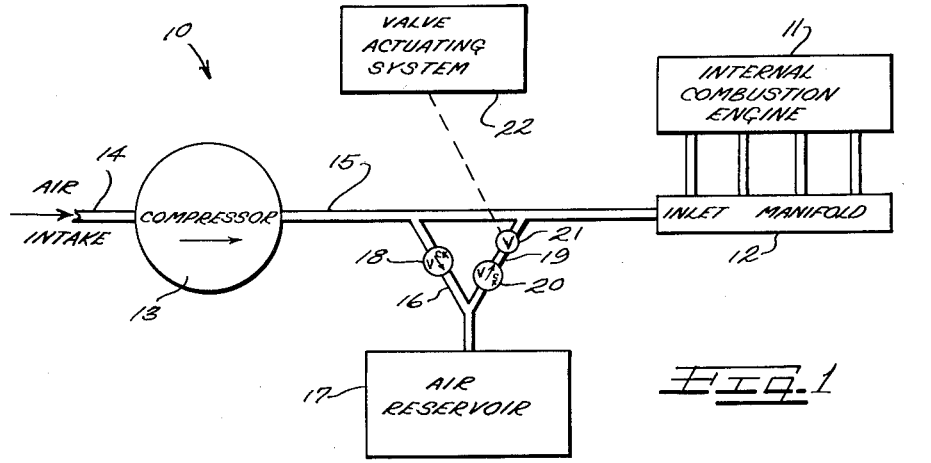
FIGURE 1 is a diagrammatic illustration of a supercharger system for an internal combustion engine constructed in accordance with the invention.

With specific reference to FIGURE 1, there is diagrammatically illustrated a supercharger 10 for an internal combustion engine 11 which has an inlet manifold 12. The supercharger 10 includes a compressor 13 that has an air intake 14 and its outlet connected to a conduit 15. The conduit 15 is coupled to the input of the inlet manifold 12 and to a conduit 16 that leads to an air reservoir 17. A conventional check valve 18 is fixed in the conduit 16 which permits air-flow in the direction of the reservoir 17 only. A second conduit 19 also connects the air reservoir 17 to the conduit 15 and it has a check valve 20 and a conventional flow control air valve 21 fixed in it. The check valve 20 permits flow of air out of the reservoir only and the flow control valve 21 is connected to be responsive to a valve actuating system 22.

When the engine 11 is operating under relatively steady state conditions, the compressor 13 supplies the mixture to the inlet manifold 12 which delivers it to the cylinders of the engine 11. The air reservoir 17 is also charged automatically through the conduit 16 and the check valve 18 whenever the manifold pressure exceeds the reservoir pressure, the reservoir being charged to a pressure that approaches the maximum compressor 13 outlet pressure. The check valve 18 prevents flow from the reservoir 17 in the direction of the compressor 13 when the pressure in the conduit 15 drops, and the valve 21 is normally closed and prevents flow through the conduit 19.

When the flow of fuel to the engine 11 is being increased, the pressure in the conduit 15 and the inlet manifold 12 is normally increased too slowly by the compressor to provide the correct increase in air flow to match the increasing fuel flow. The valve actuating system 22 immediately operates to open the flow control valve 21 which permits the flow of air from the reservoir 17 to the conduit 15. The valve actuating system 22 can be designed to be responsive to the engine governor action to perform this function. Therefore, both the compressor 13 and the reservoir 17 deliver air to the manifold 12 during periods of increased demand on the engine. The check valve 20 in the conduit 19 is provided to prevent any rapid reverse flow from the conduit 15 into the reservoir 17.

Figure 2:
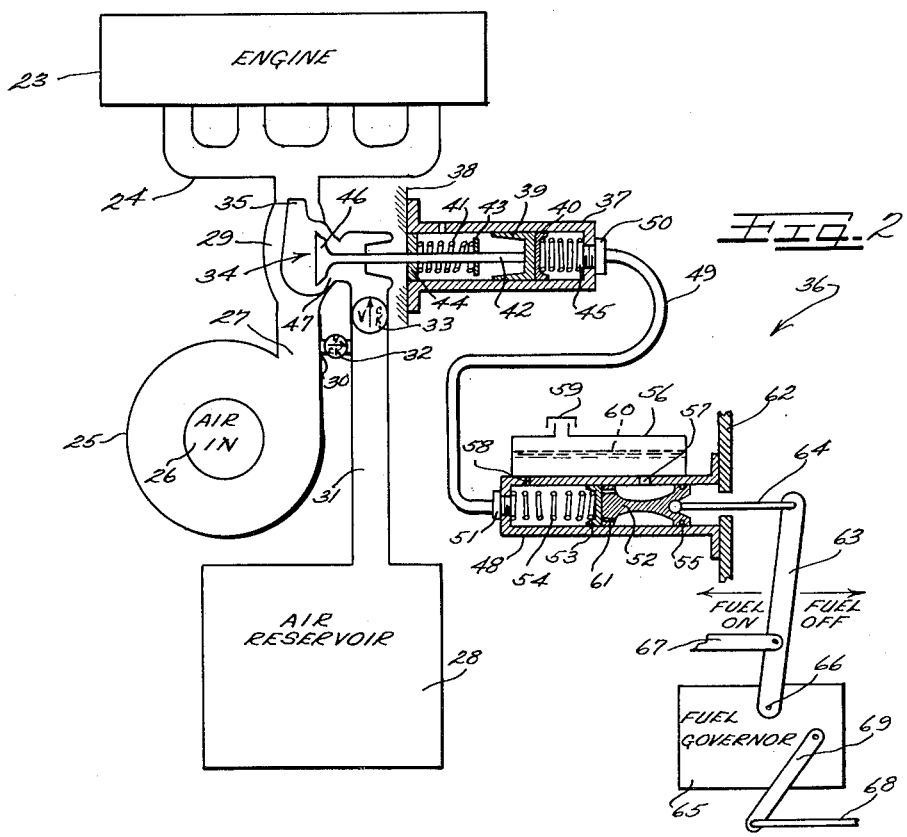
FIGURE 2 is an illustration of a hydraulically controlled supercharger system constructed in accordance with an embodiment of the invention.

The embodiment of the invention illustrated in FIGURE 2 has a hydraulic valve actuating system. This system includes an engine 23 having a manifold 24, a compressor 25 having an air intake 26 and an air outlet 27, and a reservoir 28. The compressor 25, which may be driven by a turbine (not shown) that receives the engine exhaust gases, delivers air to the manifold 24 through a fluid passageway 29 and to the reservoir 28 through two conduits 30 and 31. A one way check valve 32 is fixed in the conduit 30 and permits airflow from the compressor 25 to the reservoir 28.

The conduit 31 leading to the reservoir 28 is also connected to the intake manifold 24 through a second check valve 33 and an air flow control valve 34. The check valve 33 permits airflow in the direction of the flow control valve 34 only, and the outlet of the flow control valve 34 is in the shape of a nozzle 35 which injects the mixture toward the manifold 24, thereby inducing greater compressor air flow.

The actuating system 36 for the flow control valve 34 includes a hydraulic cylinder 37 that is mounted on a stationary frame 38. Mounted within the hydraulic cylinder 37 is a piston 39, a piston cup or seal 40, a compression valve spring 41 that is mounted around the valve actuating stem 42 between a stop 43 and an end barrier 44, and a return spring 45. The valve actuating stem 42 is mounted on the piston 39 and fastened to a valve member 46 that is designed to mate with a valve seating surface 47.

The hydraulic cylinder 37 is connected to a second hydraulic cylinder 48 by a hydraulic line 49 and two couplings 50 and 51. The second hydraulic cylinder 48 is mounted on a stationary frame 62 and has disposed therein a double faced piston 52, a flexible lipped cup 53, a piston and cup return spring 54, and a piston sealing ring 55.

A fluid reservoir 56 is fastened to the exterior of the hydraulic cylinder 48 and a fluid supply port 57 and a hydraulic bleed orifice 58 place the interior of the hydraulic cylinder 48 in communication with the reservoir 56. A vent 59 formed on the reservoir 56 permits air to pass into and out of the reservoir 56 as the fluid level 60 rises and falls.

The flexible lipped cup 53 is not fastened to the double faced piston 52, and a plurality of holes 61 formed in the face of the piston 52 permits the piston 52 to be rapidly reset. The cup 53 and the piston 52 remain in contact one with the other by virtue of the action of the spring 54. The cup acts as a seal on motion of the piston to the left and as a check valve on motion of the piston to the right. Any motion of the piston to the left that results from an increase in the fuel setting pressurizes the hydraulic system and opens the valve 34. This pressure bleeds down so that there is a timed closing of the valve 34 at a rate that is fixed by the size of the bleed orifice 58. Valve 34 thereby remains closed during steady state engine operation.

The piston 52 is mechanically coupled to a lever 63 by a push rod 64 that is pivotally mounted on both the lever 63 and the piston 52. The lever 63 is coupled at its other end to a conventional fuel governor 65 and is adapted to pivot around a point 66 in response to varying fuel requirements of the engine 23. A fuel control lever 67 is coupled to the lever 63 and adjusts the setting of a fuel control element such as a carburetor (not shown) in response to the action of the governor 65. Finally, a manually operable throttle rod 68 and a lever 69 are connected to vary the setting of the governor 65.

When the engine 23 is operating under relatively steady state conditions or is decelerating, the compressor 25 supplies air to the inlet manifold 24 and the pressure in the manifold is at a relatively high value. Under these conditions the air reservoir 28 is charged through the check valve 32, the rate at which the reservoir 28 is charged being determined by the size of this check valve 32.

When the lever 63 is rotated in a counterclockwise direction around the point 66 to increase the fuel supply, the pressure in the manifold 24 is at a relatively low value which matches the prior fuel setting and the piston 52 moves toward the left as seen in FIGURE 2. This action causes a portion of the fluid in front of the cup 53 to pass through the hydraulic line 49 and to the hydraulic cylinder 37 and force the piston 39 and the valve member 46 toward the left. Air stored within the reservoir 28 then passes through the conduit 31, the check valve 33, the flow control valve 34, and out of the nozzle 35 in the direction of the manifold 24. It can be seen, therefore, that the normal air supply to the manifold 24 provided by the compressor 25 is augmented by the air from the reservoir 28 passing through the flow control valve 34. If the lever 63 is soon after rotated in the clockwise direction around the point 66, the piston 52 and the cup 53 move toward the right which immediately relieves the hydraulic pressure and allows the valve 34 to close by its spring action. Even if the advanced position of the piston 52 is held for a considerable length of time there will still be a timed closing of the valve 34 since the fluid in the hydraulic line 49 and the cylinder 37 gradually pass into the hydraulic cylinder 48 and out through the bleed orifice 58.

The embodiment of the invention illustrated in FIGURE 3 is designed to be electrically operated and has a member that is directly responsive to the pressure in the engine manifold.

This embodiment includes an internal combustion engine 75 having a manifold 76, a compressor 77 having an air intake 78, and an air reservoir 79. The outlet 80 of the compressor 77 is connected by a passageway 81 to the manifold 76 and to the air reservoir 79 by two conduits 82 and 83. A check valve 84 disposed in the conduit 82 permits air flow only from the compressor 77 to the conduit 83.

The conduit 83 leading from the reservoir 79 is also connected to the passageway 81 by a second conduit 85 and a nozzle 86. A second check valve 87 is disposed in the conduit 85 and a solenoid operated valve 88 regulates the air flow through the conduit 85 and the nozzle 86.

The actuating system 89 for the valve 88 includes a battery 90 that has one terminal connected to ground potential and its other terminal connected to a pressure sensitive switch 91. This switch 91 has a passageway 92 leading to the manifold 76 and is adapted to close when the pressure in the manifold 76 decreases a predetermined amount below the pressure normally existing at the full power setting of the engine 75.

The switch 91 is connected by a line 93 to a reset relay 94 and to a fuel control double-throw switch 95. The position of the switch 95 is controlled by a lever 96 whose position is representative of the fuel demand of the engine 75. When the lever 96 is in the fuel off position, the movable contact 97 of the switch 95 meets the stationary reset contact 98, so that when the switch 91 is closed current flows from the battery 90, through the line 93, the switch 95, and through the winding 99 of the reset relay 94. Current flowing through the winding 99 causes the movable contact 100 of the switch 94 to meet the stationary contact 101 of this switch which connects the battery 90 to the winding 99 and locks this switch.

When the switch 91 is closed, the contacts 101 and 100 of the switch 94 are closed, and the lever 96 is rotated toward the left as seen in FIGURE 3. The movable contact 97 of the switch 95 moves to the operating position where it meets the stationary operate contact 102. The battery 90 is then connected to the line 103 and current flows through the winding 104 of an operate relay 105. This action causes the movable contact 106 of this relay to meet the stationary contact 107, which action locks this relay 105 in the closed position. It can be seen that under these operating conditions the battery 90 is connected through the closed pressure sensitive switch 91 to the line 103 even though the fuel control switch 95 may be returned to the reset position.

Potential applied to the line 103 also causes current to flow through the winding 108 of the flow control valve 88. This valve 88 is normally in the closed position and opens only when current flows through the solenoid winding 108.

The lever 96 is pivotally mounted at a point 109 and its position is representative of the setting of a fuel control rod 110, which is dictated by a fuel governor 111. The setting of the fuel governor is determined by a throttle rod 112 and a linkage 113.

In operation, assume that the engine 75 has been operating at approximately full power condition for some time so that the air reservoir 79 is charged and the pressure in the manifold 76 is at maximum. Under these conditions the switch 91 is open and power is not applied to the valve actuating system 89. As previously explained the valve 91 is responsive to the pressure in the manifold 76 and is preset to open at a manifold pressure slightly below the full power pressure in the manifold.

To the valve actuating system into operating the contacts 97 and 98 are closed by moving the lever 96 toward the fuel off position until it meets an idle stop 114, which is mounted on a stationary frame 115. Subsequently, if increased power output from the engine 75 is demanded the pressure in the manifold 76 has decreased below the preset pressure to close switch 91 by reason of the slowing down of the compressor upon reducing the fuel setting. Power from the battery 90 is then applied through the switch 95 to the relay winding 99 which closes the contacts 100 and 101 and locks the relay 94 in the closed position. Then when the lever 96 is rotated toward the left to increase the fuel supply to the engine 75 the contacts 97 and 102 close and power from the battery 90 is connected through the switch 91 and the switch 94 to the line 103 and the winding 104. The contacts 106 and 107 of the relay 105 then close and lock this relay.

Additionally, the power applied to the line 103 energizes the solenoid winding 108 of the flow control valve 88 and opens the valve 88, permitting air stored in the reservoir 79 to flow into the manifold 76. Once again, the nozzle 86 is directed toward the manifold 76 which causes increased air flow from the compressor 77 to the manifold 76.

The variable flow valve 88 remains in the open position regardless of the setting of the lever 96 and the switch 95 until the pressure in the manifold 76 increases to a predetermined value. At this point, the pressure sensitive switch 91 opens and disconnects the battery 90 which deenergizes the valve actuating system 89. This allows the valve 88 to close and prevents further flow of the air from the reservoir 79 to the manifold 76. The reservoir 79 is then again charged to the outlet pressure of the compressor 77 through the check valve 84, which also controls the rate of recharging of the reservoir. Check valve 87 serves the useful purpose of preventing a rapid flow of air from the manifold to the reservoir when upon initial starting and acceleration of the engine when valve 88 would be open and the reservoir would not have been previously charged or when the reservoir had become discharged by repetitive use without any intervening charging period. Check valves 84 and 87, therefore, allow the engine to operate in its normal manner in any event when the reservoir is not charged to a pressure greater than the existing engine manifold pressure.

Before the valve 88 can be opened once again the pressure in the manifold 76 must drop causing the pressure sensitive switch 91 to close and also the switch 95 must be momentarily returned to the reset position.

It can be seen that a novel and useful supercharger for an internal combustion engine has been provided. In accordance with the invention means are provided for augmenting the normal flow of air from a compressor to the engine manifold during periods of increased engine demand. This is accomplished by withdrawing a portion of the air from the compressor during periods of relatively steady state engine operation and storing this air in a reservoir, and then releasing this stored air into the engine manifold during periods of acceleration and increased power demand.

It will be apparent that modifications and variations may be effected without departing from this scope of the novel concepts of the present invention.

I claim as my invention:

1. A supercharger for an internal combustion engine comprising an air compressor having an inlet and an outlet, said outlet being adapted to be connected to the manifold intake of the engine, a reservoir also connected to said compressor outlet and said manifold intake, and valve means responsive to the fuel control means of the engine for charging said reservoir with air from said compressor during periods of relatively steady state engine operation and discharging said air from reservoir during periods of increased fuel flow to the engine.

2. A supercharger for an internal combustion engine comprising an air compressor having an inlet and an outlet, said outlet being adapted to be connected to the manifold intake of the engine, a reservoir having a charging port and a discharge port, said charging port being connected to said outlet of said air compressor and said discharge port being connected to said manifold intake, first valve means connected between said compressor outlet and said reservoir charging port for charging said reservoir during periods of relatively steady state engine operation, and second variable valve means connected between said reservoir discharge port and said manifold intake, said second valve means being connected to be responsive to the fuel flow to the engine.

3. A supercharger for an internal combustion engine comprising an air compressor having an inlet and an outlet, said outlet being adapted to be connected to the manifold intake of the engine, an air reservoir, a charging conduit connecting said air reservoir to said outlet of said air compressor and a discharge conduit connecting said air reservoir to the manifold intake of the engine, first valve means disposed in said charging conduit which permits air flow from said compressor outlet to said air reservoir only, second valve means disposed in said discharge conduit which permits air flow from said air reservoir to the intake manifold only, third variable flow valve means disposed in said discharge conduit, and actuating means for said third valve means which is adapted to vary the setting of said third valve means in response to variations in the fuel flow to the engine.

4. An engine having an improved air supply, comprising an internal combustion engine, an inlet manifold and a fuel control means for said engine, an air compressor having an inlet and an outlet, said compressor outlet being connected to said manifold inlet, an air reservoir connected to said compressor outlet and said manifold, and valve means responsive to the fuel control means for said engine for charging said reservoir with air from said compressor during periods of relatively steady state engine operation and discharging said air from said reservoir into said manifold during periods of increased fuel flow to said engine.

5. An engine having an improved air supply, comprising an internal combustion engine, a manifold having an inlet for said engine, an air compressor having an inlet and an outlet, said compressor outlet being connected to said manifold inlet, an air reservoir, a charging conduit connecting said air reservoir to said air compressor outlet, a discharge conduit connecting said air reservoir to said manifold inlet, first valve means fixed in said charging conduit which permits air flow from said compressor outlet to said air reservoir only, second valve means fixed in said discharge conduit which permits air flow from said air reservoir to said manifold inlet only, third variable flow valve means fixed in said discharge conduit, and actuating means for said third valve means which is adapted to vary the setting of said third valve means in response to variations in the fuel flow to said engine.

6. A supercharger for an internal combustion engine having a manifold, comprising an air compressor having an inlet and an outlet, said outlet being adapted to be connected to the manifold intake of the engine, an air reservoir, a charging conduit connecting said air reservoir to said outlet of said air compressor and a discharge conduit connecting said air reservoir to the manifold intake of the engine, first valve means fixed in said charging conduit which permits air flow from said compressor outlet to said air reservoir only, second variable flow valve means fixed in said discharge conduit, and means for actuating said second valve means in response to the fuel flow to the engine, said actuating means including a hydraulic cylinder having a piston that is coupled to said second valve means, a second hydraulic cylinder having a piston that is connected to be actuated by the fuel control means for the engine, and means hydraulically connecting said first and second hydraulic cylinders.

7. A supercharger for an internal combustion engine, comprising an air compressor having an inlet and an outlet, said outlet being adapted to be connected to the manifold intake of the engine, an air reservoir, a charging conduit connecting said air reservoir to said outlet of said air compressor, a discharge conduit connecting said air reservoir to the manifold intake of the engine, first valve means disposed in said charging conduit which permits air flow from said compressor outlet to said air reservoir, second valve means disposed in said discharge conduit which permits air flow from said air reservoir to the intake manifold only, third variable flow valve means disposed in said discharge conduit, and actuating means for said third valve means, said actuating means including a first hydraulic cylinder having a hydraulic piston and an actuating stem disposed therein, said actuating stem being connected to operate said third valve means, a second hydraulic cylinder connected by a hydraulic line to said first hydraulic cylinder, a piston and a flexible cup disposed in said second hydraulic cylinder, a hydraulic reservoir attached to said second hydraulic cylinder, an orifice formed in said second hydraulic cylinder connecting said reservoir to the interior of said hydraulic cylinder on a first side of said piston, a second orifice formed in said hydraulic cylinder connecting said fluid reservoir to the interior of said hydraulic cylinder on the opposite side of said piston, a plurality of holes formed through said piston, spring means disposed in said second hydraulic cylinder which is adapted to exert force against said first side of said piston, and lever means connected to said piston which is adapted to vary the position of said piston in said second hydraulic cylinder in response to variations in the setting of the fuel control means for said engine.

8. A supercharger for an internal combustion engine, comprising an air compressor having an inlet and an outlet, said outlet being adapted to be connected to the manifold intake of the engine, a reservoir having a charging port and a discharge port, said charging port being connected to said outlet of said air compressor and said discharge port being adapted to be connected to the manifold intake, first valve means connected between said compressor outlet and said reservoir charging port for charging said reservoir during periods of relatively steady state engine operation, and second variable flow valve means connected between said reservoir discharge port and said manifold intake, an electrical actuating means connected to actuate said variable flow valve means in response to the fuel flow to the engine, said electrical actuating means including a pressure sensitive switch that is connected to said engine manifold and adapted to energize said electrical actuating means when the pressure in the manifold falls below a predetermined value.

9. A supercharger for an internal combustion engine, comprising an air compressor connected to the intake manifold for the engine, an air reservoir having a charging port and a discharge port, said charging port being connected to said air compressor, first valve means connected between said compressor and said reservoir charging port for charging said reservoir during periods of relatively steady state engine operation, second valve means disposed between said reservoir discharge port and said manifold intake which permits air flow in the direction of said manifold intake only, third variable flow means connected between said reservoir discharge port and said manifold intake, an electrical actuating means connected to vary the setting of said variable flow valve means, said electrical actuating means including a switch that is responsive to the pressure in the inlet manifold and is adapted to open when the pressure in the manifold is at a substantially maximum value and to close when the pressure in the manifold falls a predetermined amount below the maximum pressure, said pressure sensitive switch being connected to apply power when it is closed to a second switch which has a reset position and an operate position, said second switch being connected to close a first relay when it is in said reset position and said pressure sensitive switch is closed and being connected to close a second relay when it is in said operate position and said pressure sensitive switch is closed, said third variable flow valve means having an electrical winding that is adapted to open said valve when said pressure sensitive switch is closed and said first and second relays are closed, said second switch being adapted to be placed in either said reset position or said operate position in response to variations in the fuel control setting for the engine.

No references cited.